UNITED STATES PATENT OFFICE.

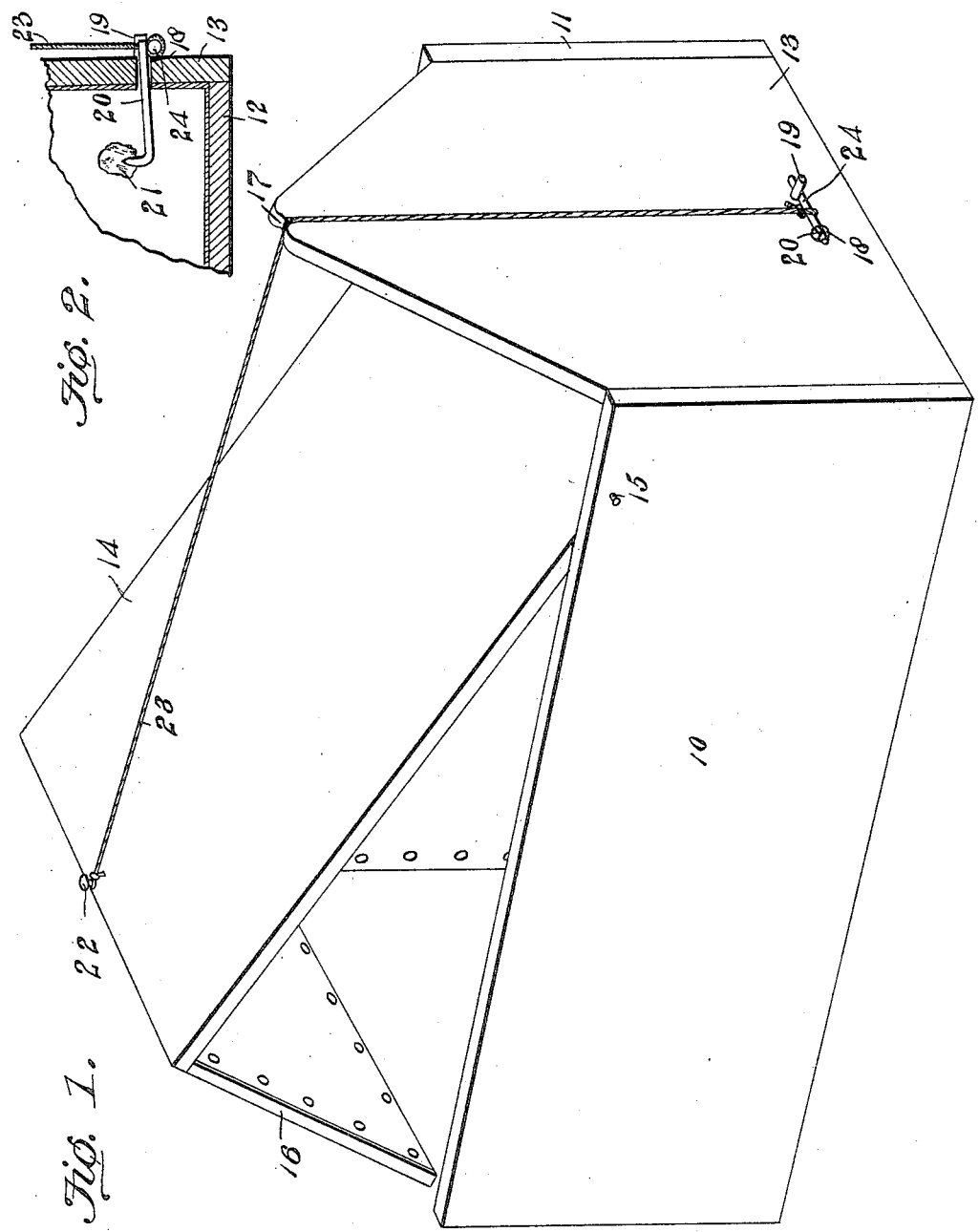

JAMES CLAUDE ALSOBROOK, OF SORRENTO, FLORIDA.

ANIMAL-TRAP.

No. 812,472.　　　　Specification of Letters Patent.　　　　Patented Feb. 13, 1906.

Application filed December 1, 1905. Serial No. 289,843.

*To all whom it may concern:*

Be it known that I, JAMES CLAUDE ALSOBROOK, a citizen of the United States, residing at Sorrento, in the county of Lake and State of Florida, have invented a new and useful Animal-Trap, of which the following is a specification.

This invention relates to improvements in animal-traps, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claim.

Figure 1 is a perspective view of the improved trap in its open or set position. Fig. 2 is a sectional detail of the tripping mechanism of the trap.

The improved trap comprises a casing of any required size, according to the animal to be trapped, and preferably with closed sides 10 11, bottom 12, and one end 13, and with the top and the other end open. The open top space is occupied by a plate 14, hinged at 15 to swing vertically, and with a plate 16, connected thereto to the free end to occupy the space of the open end of the casing when the united members 14 16 are closed. The closed end 13 is extended upwardly and provided with a guide-notch 17 at the upper end and also provided with an aperture 18, preferably near the bottom 12, and with a stop-pin 19, extending from the end near the aperture. Projecting through the aperture 18 is a rod 20, having means at the inner end for attaching the bait, (represented at 21.) Attached at 22 to the free end of the movable member 14 is a trip-cord 23, extending thence over the notch 17 and down to a bar 24, extending beneath the projecting end of the rod 20 and the stop member 19, as shown in Figs. 1 and 2.

The length of the cord 23 is just sufficient to extend between the fastening means 22 and the bar 24 when the closure members 14 16 are in elevated position, as in Fig. 1, and then when an animal enters the receptacle and attacks the bait 21 the rod 20 is withdrawn, the bar 24 released, and the receptacle closed by the falling of the members 14 16.

The receptacle and its closure members may be of any required material and when of wood will be lined with sheet metal to prevent the escape of the animals by gnawing through the material of the trap.

The device is simple in construction, certain in action, and may be readily adapted for all sizes and species of animals.

Having thus described the invention, what is claimed is—

A trap comprising a receptacle closed at one end and with an aperture through the closed end, a stop spaced from the aperture, a swinging closure to said receptacle, a rod projecting through said aperture and with means at the inner end for supporting the bait, a bar disposed transversely beneath said stop and the projecting end of the bait-rod, and a trip-cord connected at one end to said bar and at the other end to the free end of said movable closure.

In testimony that I claim the foregoing as my own I have hereto affixed my signature in the presence of two witnesses.

JAMES CLAUDE ALSOBROOK.

Witnesses:
　A. M. ANDERSON,
　A. E. ALLEN.